(12) United States Patent
Hollinger

(10) Patent No.: US 10,016,045 B1
(45) Date of Patent: Jul. 10, 2018

(54) FOLDAWAY MIRROR

(71) Applicant: E. MISHAN & SONS, INC., New York, NY (US)

(72) Inventor: Fred Hollinger, Monroe Township, NJ (US)

(73) Assignee: E. Mishan & Sons, Inc., New York, NY (US)

( * ) Notice: Subject to any disclaimer, the term of this patent is extended or adjusted under 35 U.S.C. 154(b) by 0 days.

(21) Appl. No.: 15/625,668

(22) Filed: Jun. 16, 2017

(51) Int. Cl.
*A45D 42/00* (2006.01)
*F21L 4/00* (2006.01)
*F21V 23/04* (2006.01)
*F21V 21/26* (2006.01)
*G02B 7/182* (2006.01)
*F21Y 115/10* (2016.01)

(52) U.S. Cl.
CPC ............... *A45D 42/00* (2013.01); *F21L 4/00* (2013.01); *F21V 21/26* (2013.01); *F21V 23/0414* (2013.01); *G02B 7/182* (2013.01); *F21Y 2115/10* (2016.08)

(58) Field of Classification Search
CPC ...... A45D 42/10; A45D 33/008; F21V 21/26; G02B 7/182
See application file for complete search history.

(56) References Cited

U.S. PATENT DOCUMENTS

| | | | |
|---|---|---|---|
| 5,453,915 A * | 9/1995 | Bradley, III | A45D 42/10 248/474 |
| D409,003 S | 5/1999 | Scavini | |
| D425,313 S | 5/2000 | Zadro | |
| 6,206,530 B1 | 3/2001 | Eberts | |
| D442,371 S | 5/2001 | Eberts | |
| D454,701 S | 3/2002 | Eric | |
| D504,780 S | 5/2005 | Pitot | |
| D524,469 S | 7/2006 | Pitot et al. | |
| 7,090,378 B1 * | 8/2006 | Zadro | A45D 42/10 362/109 |
| D530,523 S | 10/2006 | Pitot et al. | |
| D549,968 S | 9/2007 | Pitot et al. | |
| D554,802 S | 11/2007 | Pitot | |
| D562,571 S | 2/2008 | Pitot | |
| D573,799 S | 7/2008 | Pitot | |
| D589,267 S | 3/2009 | Pitot | |
| D649,790 S | 12/2011 | Pitot | |
| D652,220 S | 1/2012 | Pitot | |

(Continued)

*Primary Examiner* — William N Harris
(74) *Attorney, Agent, or Firm* — Notaro, Michalos & Zaccaria P.C.

(57) ABSTRACT

A foldaway mirror assembly has a support; an arm pivotally connected to the support, a mirror member pivotally connected to the arm, the arm having two portions that are rotatably connected so that the mirror member can be rotated and pivoted, first and second pivot connections connecting the respective support and mirror members to the arm and each comprising a click-stop mechanism for establishing a plurality of firm but movable pivot positions for the arm on the support and for the mirror member on the arm, a non-magnifying mirror on one side of the mirror member, a magnifying mirror on an opposite side of the mirror member, at least one light source mounted to the mirror member for illuminating the mirrors and a power supply in the support and electrically connected to the light source for powering the light source.

20 Claims, 7 Drawing Sheets

(56) References Cited

U.S. PATENT DOCUMENTS

| | | |
|---|---|---|
| D657,576 S | 4/2012 | Pitot |
| D679,101 S | 4/2013 | Pitot |
| D707,454 S | 6/2014 | Pitot |
| 2006/0077654 A1* | 4/2006 | Krieger ................ A45D 33/008 362/136 |
| 2011/0002132 A1* | 1/2011 | Park ........................ F21V 21/15 362/429 |
| 2016/0051034 A1* | 2/2016 | Nikolov .................. A47G 1/04 359/860 |
| 2017/0164719 A1* | 6/2017 | Wheeler ................ A45D 42/10 |
| 2017/0261188 A1* | 9/2017 | Brindle ................ A45D 42/10 |

\* cited by examiner

FOLDAWAY MIRROR

FIELD AND BACKGROUND OF THE INVENTION

The present invention relates generally to the field of personal care devices and in particular to a new and useful foldaway mirror assembly having a two-sided and lighted mirror member, mounted on a pivotable and rotatable arm which is supported on a stand or support member containing a power supply for one or more lights in the mirror member.

Mirrors of the magnifying and non-magnifying type, on stands for hands-free use, are known.

A need remained, however, for a lighted, foldaway mirror having a compact storage position as well and multiple, secure and versatile use positions.

SUMMARY OF THE INVENTION

It is an object of the present invention to provide a foldaway, lighted mirror having two reflecting mirror faces and supported on a support member or stand in a wide variety of positions for use.

Another object of the invention is to provide a foldaway mirror assembly comprising a support, an arm pivotally connected to the support, a mirror member pivotally connected to the arm, the arm having two portions that are rotatably connected so that the mirror member can be rotated and pivoted, first and second pivot connections connecting the respective support and mirror members to the arm and each comprising a click-stop mechanism for establishing a plurality of firm but movable pivot positions for the arm on the support and for the mirror member on the arm, a non-magnifying mirror on one side of the mirror member, a magnifying mirror on an opposite side of the mirror member, at least one light source mounted to the mirror member for illuminating the mirrors and a power supply in the support and electrically connected to the light source for powering the light source.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
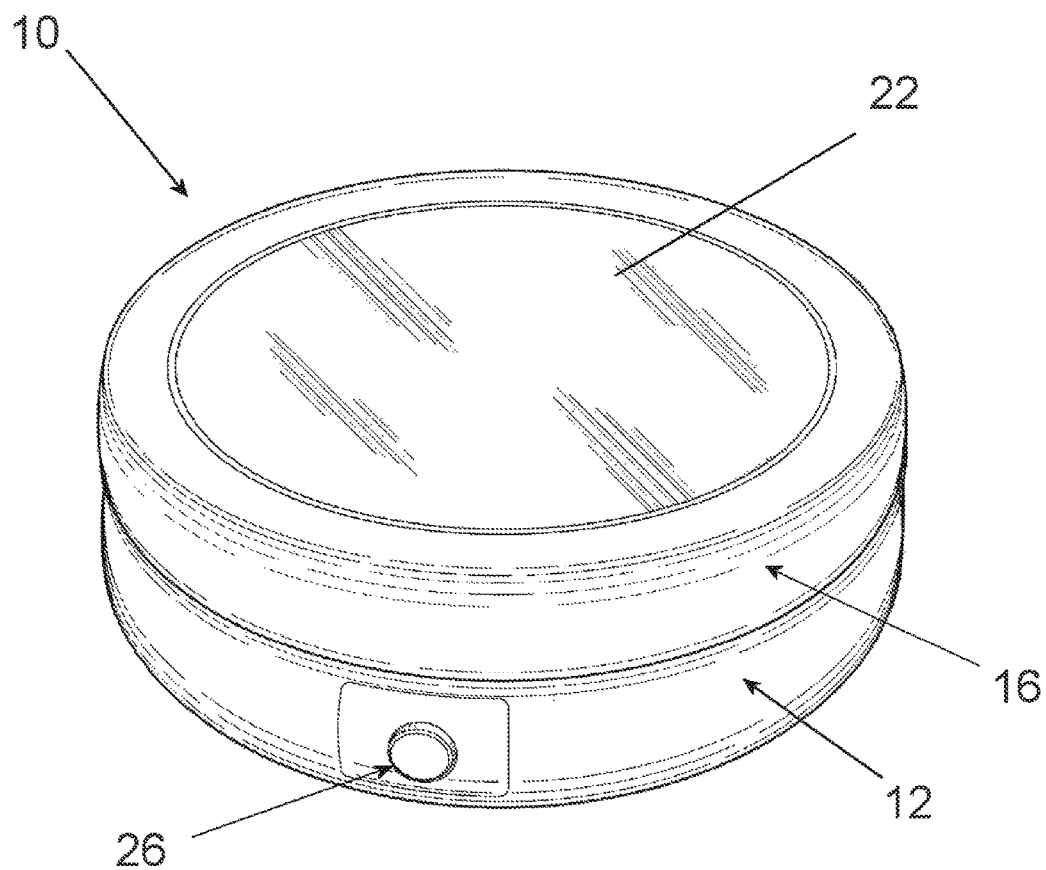
FIG. 1 is a perspective view of the foldaway mirror assembly of the invention in a fully folded position for storage.
Figure 2:
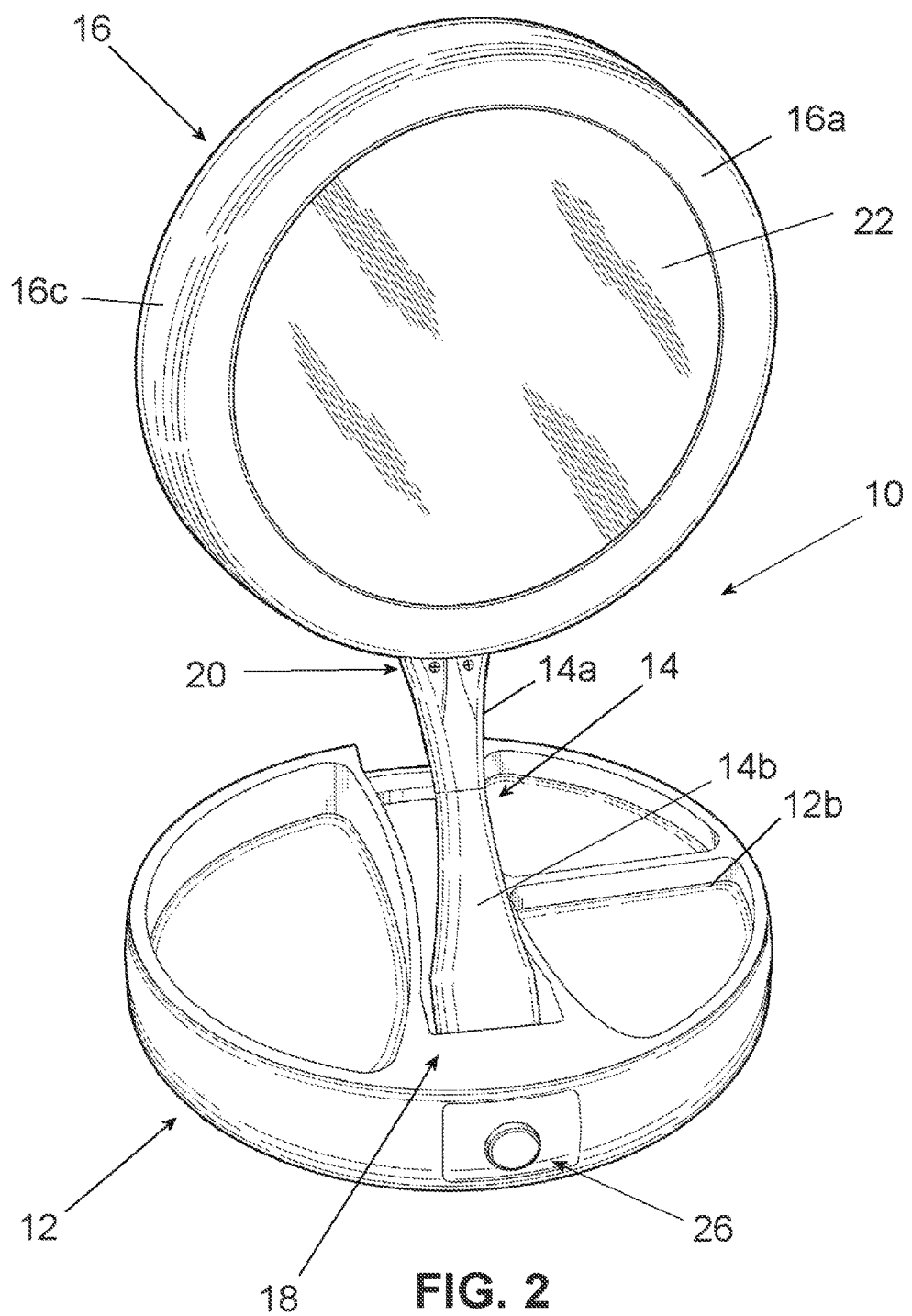
FIG. 2 is a perspective view of the foldaway mirror assembly in one of any number of open positions for use.
Figure 3:
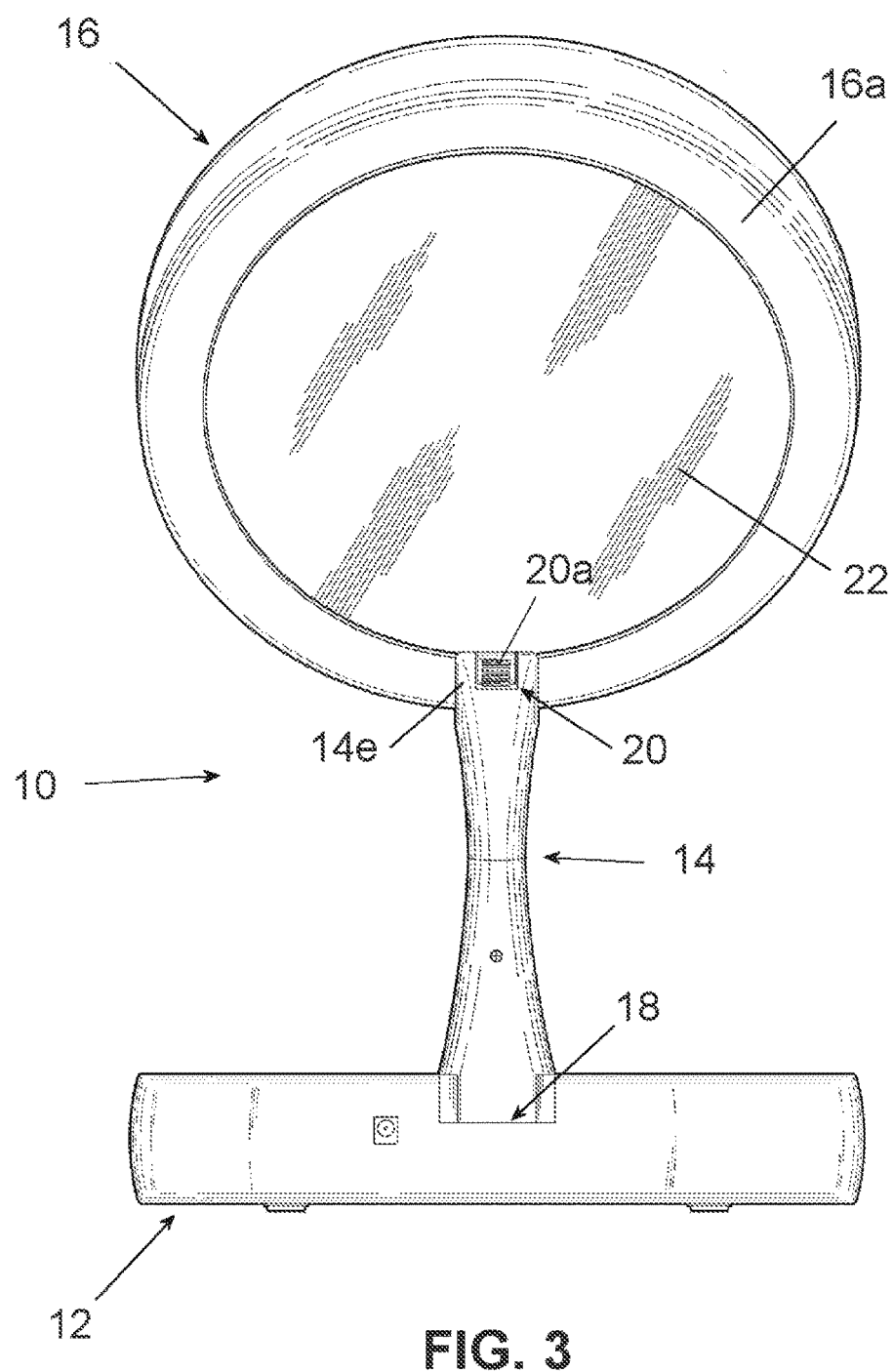
FIG. 3 is a rear view of the assembly in a use position.

Referring now to the drawings, in which like reference numerals are used to refer to the same or similar elements, FIGS. 1 to 5 show a foldaway mirror assembly 10 having a storage position in FIG. 1 and any number of use positions, one of which is shown in FIG. 2.

The mirror assembly 10, comprising a support member or stand 12 having an lower surface 12a for being supported on a support surface like a counter top or table, and an upper surface 12b having a perimeter. A support arm 14 of the assembly has a lower portion 14b with a lower end pivotally connected to the support member 12 near the perimeter of the upper surface 12b of the support member, and at a first pivot connection 18.

The assembly includes a mirror member 16 having opposite surfaces and a perimeter around the opposite surfaces, this mirror member being pivotally connected to an opposite end of the support arm 14 on an upper portion 14a thereof, near the perimeter of the mirror member 16 and at a second pivot connection 20.

Figure 4:
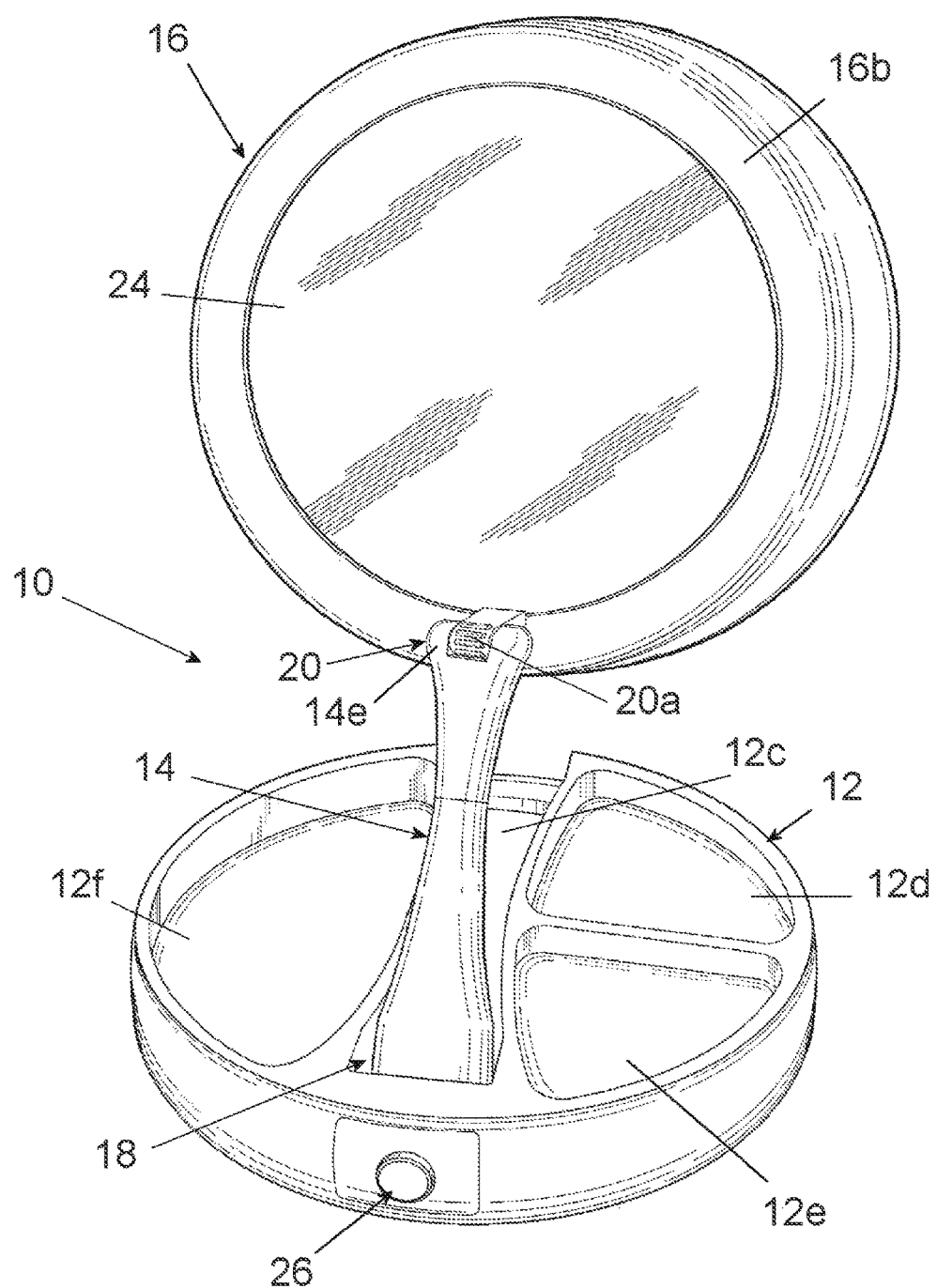
FIG. 4 is perspective view of the foldaway mirror assembly in another position for use.
Figure 5:
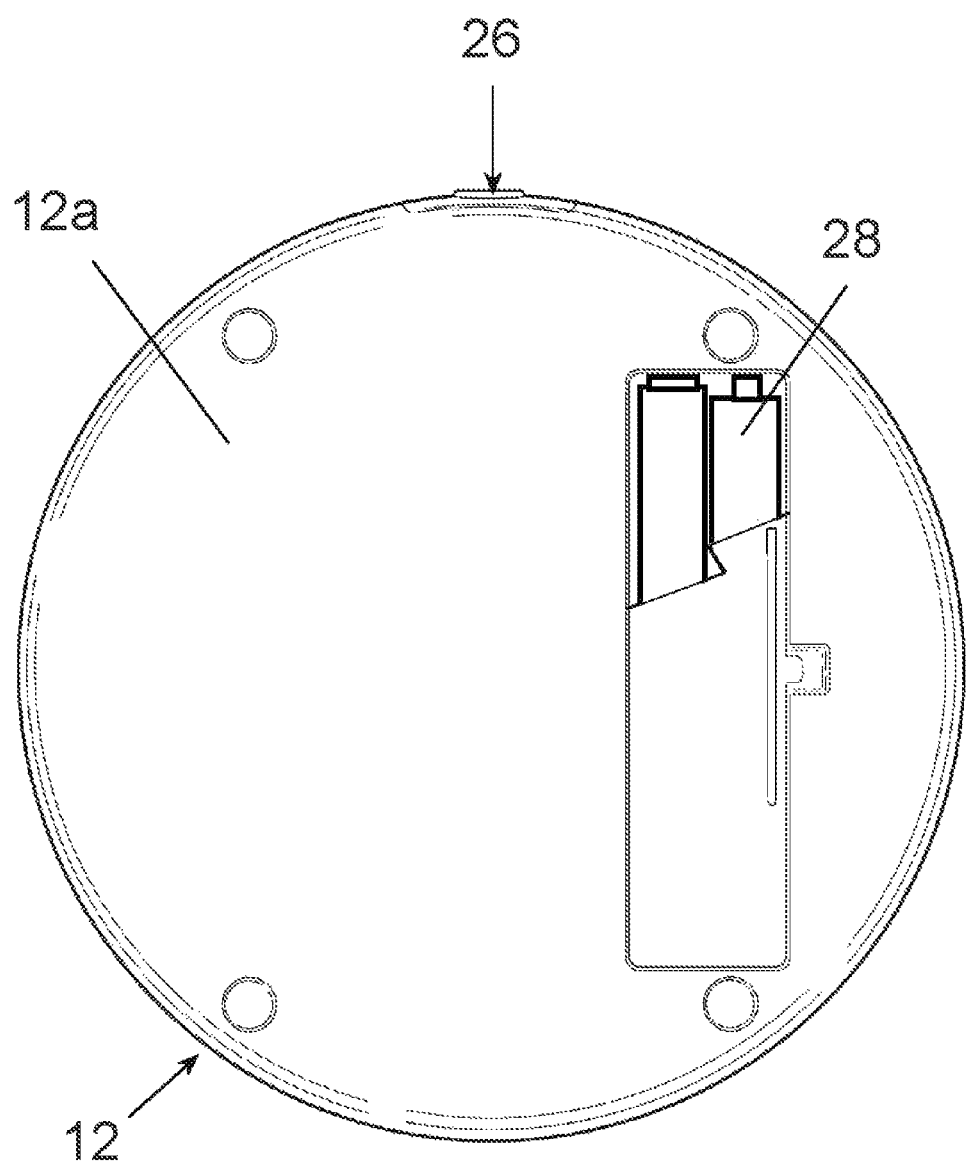
FIG. 5 is a bottom view of the assembly with part of a battery compartment door cut away to reveal batteries that may serve as a power supply for a light source of the assembly.
Figure 6:
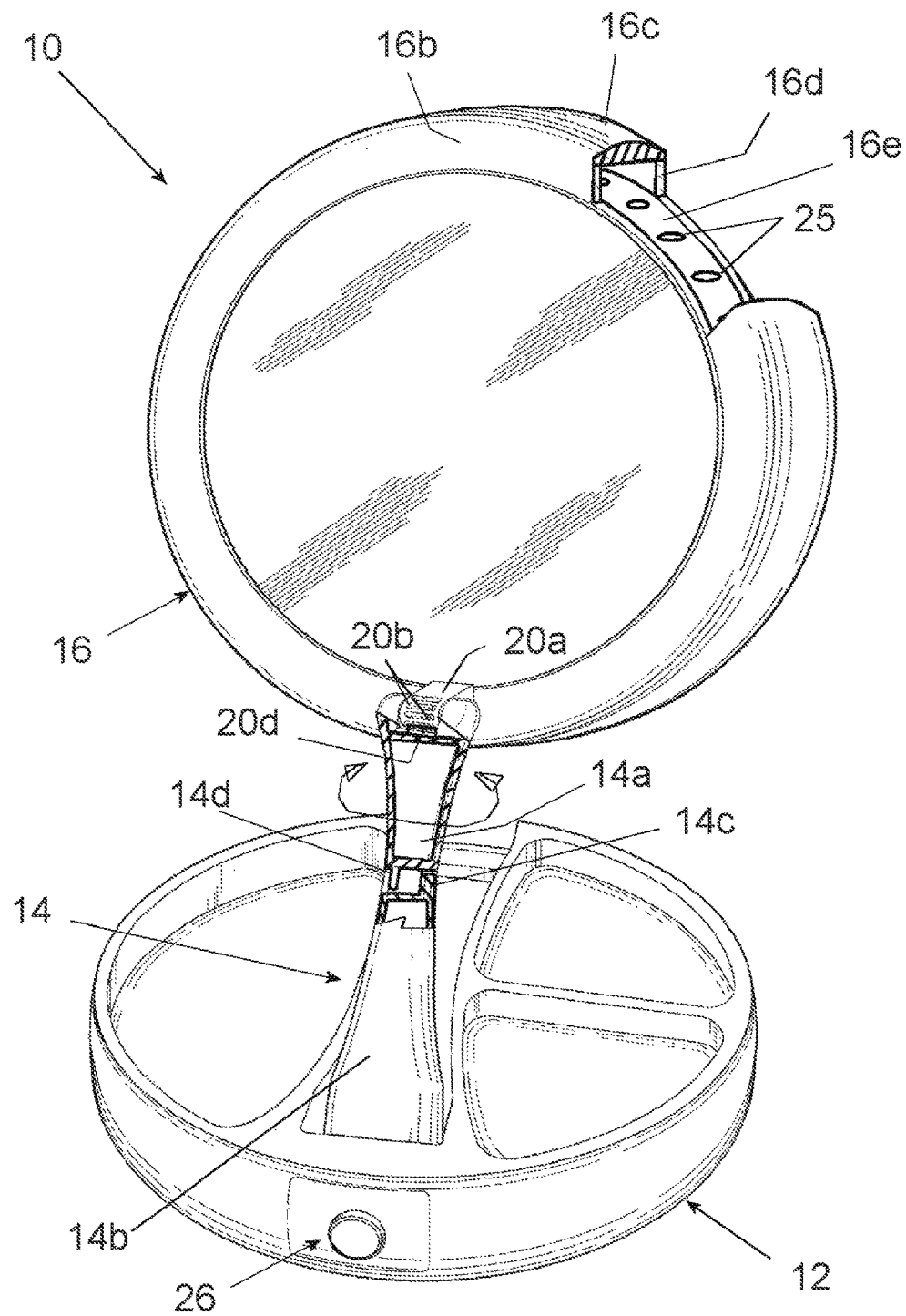
FIG. 6 is a perspective view like FIG. 4 but with parts cut away to reveal internal structures of the foldaway mirror assembly of the invention.
Figure 7:
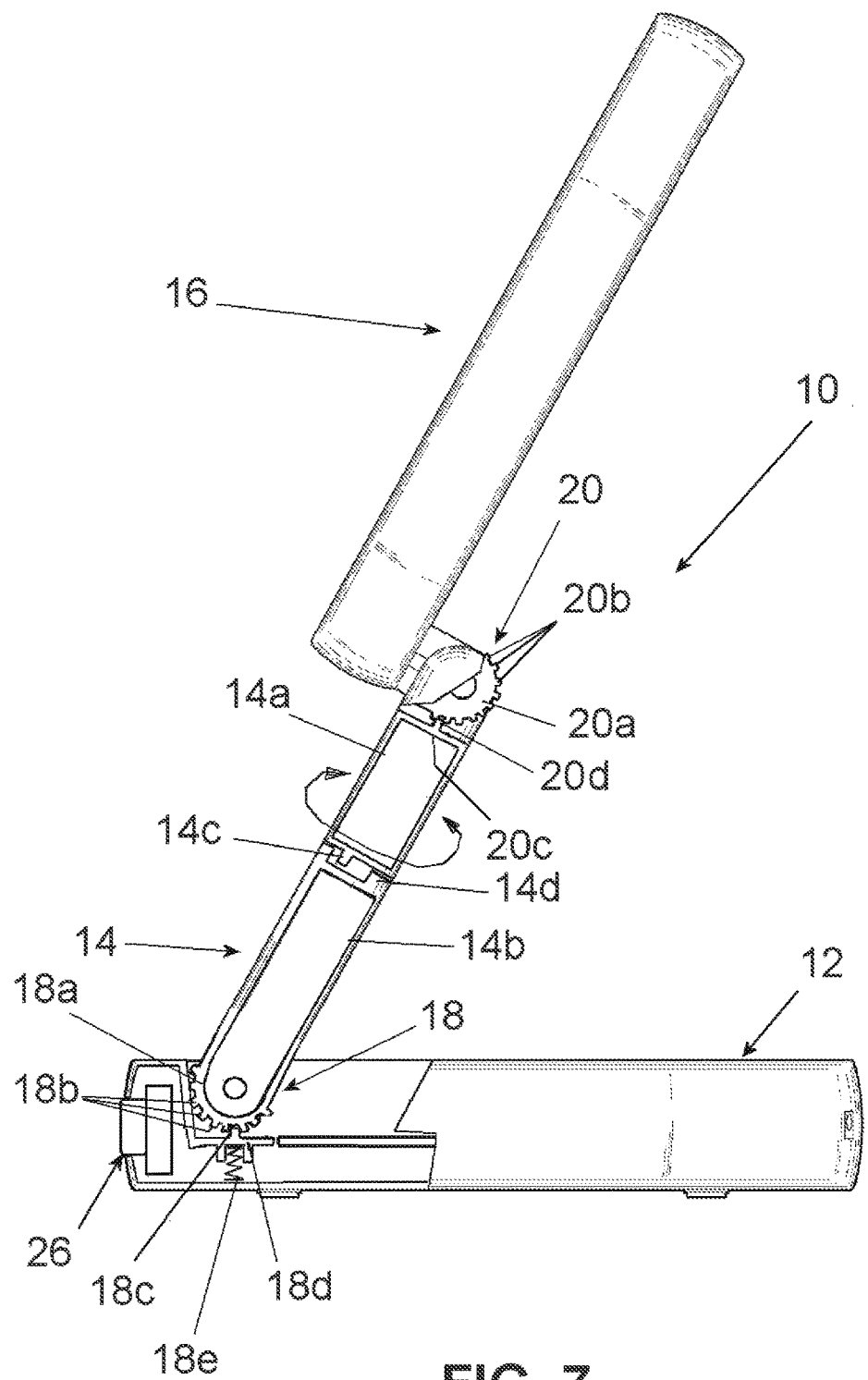
FIG. 7 is a side view of the assembly with parts cut away to reveal internal structures of the assembly of the invention.

The upper and lower portions 14a, 14b, of the support arm 14 are rotatably connected to each other so that the mirror member 16 can be rotated, for example, in the directions of the double arrows in FIGS. 6 and 7, and pivoted on pivot connections 18 and 20, with respect to the support member 12, into a multiplicity of use positions with either of the two mirrors 22 in FIG. 2 or 24 in FIG. 4, facing the user at the most convenient angle. One of the mirrors, e.g. mirror 22, is non-magnifying to return an actual size reflection, and the other, e.g. mirror 24, is magnifying to return a magnified, e.g. 2× to 15×, reflection.

Each of the first and second pivot connections 18 and 20, comprises a click-stop mechanism for establishing a plurality of firm but movable pivot positions for the support arm 14 on the support member 12 and for the mirror member 16 on the support arm 14.

The non-magnifying mirror 22 on one of the opposite surfaces of the mirror member 16 leaves a first exposed perimeter surface 16a around the mirror that is illuminated by lights, e.g. LEDs, mounted inside the mirror member, this perimeter area being make of a translucent wall material. The magnifying mirror 24 on the opposite surface of the mirror member 16 also leaving a second exposed and translucent walled, perimeter surface 16b so that this mirror may be illuminated as well.

As shown in FIG. 6, at least one, but preferably many circumferentially spaced light sources such as LEDs 25 are mounted in the mirror member 16, for illuminating the first and second exposed perimeter surfaces 16a and 16b. The LEDs 25 are circumferentially spaced around the outer circumference of an inner cylindrical core 16e of the mirror member 16, between opposite translucent perimeter walls 16b and 16d that extend on the perimeters of the opposite surfaces of the mirror member 16, the LEDs 25 being radially within an outer opaque perimeter wall 16c extending around an outer perimeter of the mirror member 16.

These LEDs 25, when powered, illuminate the translucent perimeter walls at the first and second exposed perimeter surfaces 16a and 16b when a switch 26 in support member 12 is closed, for closing a circuit connecting a power supply, e.g. batteries 28 in a battery compartment behind a battery door at the bottom of the support member 12, to the light sources 25. This circuit includes wires extending from the support member 12, through the support arm 14 and into the mirror member 16, to be electrically connected to the light sources 25 for powering the light sources to illuminate the exposed perimeter surfaces. Switch 26 is a push-button on-off switch and may alternatively be mounted on the arm or on the mirror member, and may be any type of switch.

With reference to FIGS. 6 and 7, each click-stop mechanism comprises a semi-cylindrical portion connected to either the support arm or the mirror member with a plurality of circumferentially spaced stop tabs thereon, and a resiliently mounted stop boss connected to either the support arm or the support member, for engaging between a pair of these stop tabs to establish each firm pivotal position for the arm 14 and for the mirror member 16.

In greater detail, the click-stop mechanism of the first pivot connection 18 comprises a semi-cylindrical portion 18a at the lower end of support arm 14, forming a lower part of the lower portion 14b of the support arm, and having a plurality of circumferentially spaced, axially extending stop tabs 18b thereon. A resiliently mounted stop boss 18c is connected to support member 12, for engaging between a pair of these stop tabs 18b to establish each pivot position between the support arm 14 and the support member 12. The resiliency of the stop boss 18c is established by it being formed of strong but somewhat flexible plastic, and as one piece with a flexible finger 18d in support member 12. Resiliency of the finger 18d is further enhanced by it also being backed by a compression coil spring 18e that is held between the finger 18d and the inner surface of the bottom wall of the support member 12. To keep spring 18e from moving out of place, its upper end is trapped inside a blind cylinder formed at the bottom of the finger 18d.

The click-stop mechanism of the second pivot connection 20 comprises a semi-cylindrical portion 20a connected to the mirror member 16 and having a plurality of circumferentially spaced and axially extending stop tabs 20b thereon, and a resiliently mounted stop boss 20d formed as one piece with an upper end wall 20c of the upper portion 14a of the support arm 14, for engaging between a pair of these stop tabs 20b to establish each pivot position between the mirror member 16 and the support arm 14. The semi-cylindrical portion 20a of the mirror member 16 is pivotally mounted between ears 14e at the end of the upper portion 14a of the support arm 14. The residency of the stop boss 20d is achieved by a combination of the slight flexing of the upper wall 20c and the flexibility of the tabs and boss since they, like the tabs, finger and boss of the first pivot connection 18, are made of strong but somewhat flexible plastic.

To avoid over-twisting the wires extending through the support arm 14, the upper and lower portions 14a and 14b of the support arm 14 are rotatably connected to each other for relative rotation of up to about 270 degrees in either direction, but not more. This limit to the relative rotation is achieved by each of the upper and lower portions (14a, 14b) having cylindrical parts engaging each other near the middle of the support arm 14, each cylindrical part having a circumferentially located rotation stop 14c and 14d, for engaging each other as the upper portion is rotated on the lower portion of the arm, so that relative rotation between the upper and lower portions is limited to up to about 270 degrees. More or less rotation as also possible but limited only by the amount of twistings the wires in arm 14 can accept. An alternate embodiment uses contact rings (not shown) to electrically connect the power source to the light sources and that allow unlimited rotation.

For an ergonomic appeal and function, the mirror member 16 and the support member 12 are each substantially cylindrical with convex outer perimeters and substantially equal diameters and thicknesses.

The upper surface 12b of the support member 12 has a trough 12c sized to receive the support arm 14 therein when the support arm is pivoted toward the support member in the storage position of FIG. 1, and at least one storage bin 12d, 12e and 12f are provided next to the trough on either side, to store small items like hair pins, small cosmetic items and the like, which are retained in these bins when the assembly is it its storage position, since the mirror member 16 will act like a lid in this position.

The upper and lower portions (14a, 14b) of the support arm 14 are tapered outwardly toward each end of the support arm and the trough 12c also likewise tapered outwardly to closely receive the support arm and provide an attractive and again ergonomic feature since the arm 14 may be used as a lifting handle to carry and move the assembly about.

While a specific embodiment of the invention has been shown and described in detail to illustrate the application of the principles of the invention, it will be understood that the invention may be embodied otherwise without departing from such principles.

What is claimed is:

1. A foldaway mirror assembly comprising:
    a support member having a lower surface for being supported on a support surface, and an upper surface having a perimeter;
    a support arm having with one end pivotally connected to the support member on a lower portion of the support arm near the perimeter of the upper surface and at a first pivot connection;
    a mirror member having opposite surfaces and a perimeter around the opposite surfaces, the mirror member being pivotally connected to an opposite end of the support arm on an upper portion of the support arm, near the perimeter of the mirror member and at a second pivot connection;
    the upper and lower portions of the support arm being rotatably connected to each other so that the mirror member can be rotated and pivoted with respect to the support member;
    the first and second pivot connections each comprising a click-stop mechanism for establishing a plurality of firm but movable pivot positions for the support arm on the support member and for the mirror member on the support arm;
    a non-magnifying mirror on one of the opposite surfaces of the mirror member leaving a first exposed perimeter surface;
    a magnifying mirror on the other of the opposite surfaces of the mirror member leaving a second exposed perimeter surface;
    at least one light source mounted to the mirror member for illuminating the first and second exposed perimeter surfaces; and
    a power supply in the support member and electrically connected to the light source for powering the light source to illuminate the exposed perimeter surfaces.

2. The foldaway mirror assembly of claim 1, wherein each click-stop mechanism comprises a semi-cylindrical portion connected to either the support arm or the mirror member with a plurality of circumferentially spaced stop tabs thereon, and a resiliently mounted stop boss connected to either the support arm or the support member, for engaging between a pair of said stop tabs to establish each pivot position.

3. The foldaway mirror assembly of claim 1, wherein the click-stop mechanism of the first pivot connection comprises a semi-cylindrical portion connected to the lower portion of the support arm with a plurality of circumferentially spaced stop tabs thereon, and a resiliently mounted stop boss connected to the support member, for engaging between a pair of stop tabs of the first pivot connection to establish each pivot position between the support arm and the support member, and wherein the click-stop mechanism of the second pivot connection comprises a semi-cylindrical portion connected to the mirror member with a plurality of circumferentially spaced stop tabs thereon, and a resiliently mounted stop boss connected to the upper portion of the support arm, for engaging between a pair of stop tabs of the second pivot connection to establish each pivot position between the mirror member and the support arm, the semi-cylindrical portion of the mirror member being pivotally mounted between ears at the ends of the upper portion of the support arm.

4. The foldaway mirror assembly of claim 1, wherein the upper and lower portions of the support arm are rotatably connected to each other for relative rotation of up to 270 degrees.

5. The foldaway mirror assembly of claim 1, wherein each of the upper and lower portions of the support arm have cylindrical parts engaging each other, each cylindrical part having a circumferentially located rotation stop for engaging each other so that relative rotation between the upper and lower portions is limited to up to 270 degrees.

6. The foldaway mirror assembly of claim 1, wherein the mirror and support members are each substantially cylindrical with convex outer perimeters and substantially equal diameters and thicknesses.

7. The foldaway mirror assembly of claim 1, wherein the upper surface of the support member has a trough sized to receive the support arm therein when the support arm is pivoted to the support member, and at least one storage bin next to the trough.

8. The foldaway mirror assembly of claim 1, wherein the upper surface of the support member has a trough sized to receive the support arm therein when the support arm is pivoted to the support member, and at least one storage bin next to the trough, the upper and lower portions of the support arm tapering outwardly toward each end of the support arm, the trough also tapering outwardly to closely receive the support arm.

9. The foldaway mirror assembly of claim 1, including a plurality of said at least one light source mounted in the mirror member between opposite translucent perimeter walls extending on the opposite surfaces of the mirror member, and within an outer opaque perimeter wall extending around an outer perimeter of the mirror member, for illuminating the translucent perimeter walls at the first and second exposed perimeter surfaces, and a switch in one of the mirror member, support member and support arm, for closing a circuit connecting the power supply in the support member and the light sources.

10. The foldaway mirror assembly of claim 1, including a plurality of said at least one light source mounted in the mirror member, circumferentially spaced on an inner cylindrical core of the mirror member, between opposite translucent perimeter walls extending on the opposite surfaces of the mirror member, and within an outer opaque perimeter wall extending around an outer perimeter of the mirror member, for illuminating the translucent perimeter walls at the first and second exposed perimeter surfaces, and a switch in one of the mirror member, support member and support arm, for closing a circuit connecting the power supply in the support member and the light sources.

11. A foldaway mirror assembly comprising:
a support member;
a support arm pivotally connected to the support member;
a mirror member pivotally connected to the support arm;
the support arm having upper and lower portions that are rotatably connected to each other so that the mirror member can be rotated and pivoted with respect to the support member;
first and second pivot connections connecting the respective support member and mirror member, to the support arm and each comprising a click-stop mechanism for establishing a plurality of firm but movable pivot positions for the support arm on the support member and for the mirror member on the support arm;
a non-magnifying mirror on one side of the mirror member;
a magnifying mirror on an opposite side of the mirror member;
at least one light source mounted to the mirror member for illuminating the mirrors; and
a power supply in the support member and electrically connected to the light source for powering the light source.

12. The foldaway mirror assembly of claim 11, wherein each click-stop mechanism comprises a semi-cylindrical portion connected to either the support arm or the mirror member with a plurality of circumferentially spaced stop tabs thereon, and a resiliently mounted stop boss connected to either the support arm or the support member, for engaging between a pair of said stop tabs to establish each pivot position.

13. The foldaway mirror assembly of claim 11, wherein the click-stop mechanism of the first pivot connection comprises a semi-cylindrical portion connected to the lower portion of the support arm with a plurality of circumferentially spaced stop tabs thereon, and a resiliently mounted stop boss connected to the support member, for engaging between a pair of stop tabs of the first pivot connection to establish each pivot position between the support arm and the support member, and wherein the click-stop mechanism of the second pivot connection comprises a semi-cylindrical portion connected to the mirror member with a plurality of circumferentially spaced stop tabs thereon, and a resiliently mounted stop boss connected to the upper portion of the support arm, for engaging between a pair of stop tabs of the second pivot connection to establish each pivot position between the mirror member and the support arm, the semi-cylindrical portion of the mirror member being pivotally mounted between ears at the ends of the upper portion of the support arm.

14. The foldaway mirror assembly of claim 11, wherein the upper and lower portions of the support arm are rotatably connected to each other for relative rotation of up to 270 degrees.

15. The foldaway mirror assembly of claim 11, wherein each of the upper and lower portions of the support arm have cylindrical parts engaging each other, each cylindrical part having a circumferentially located rotation stop for engaging each other so that relative rotation between the upper and lower portions is limited to up to 270 degrees.

16. The foldaway mirror assembly of claim 11, wherein the mirror and support members are each substantially cylindrical with convex outer perimeters and substantially equal diameters and thicknesses.

17. The foldaway mirror assembly of claim 11, wherein the upper surface of the support member has a trough sized to receive the support arm therein when the support arm is pivoted to the support member, and at least one storage bin next to the trough.

18. The foldaway mirror assembly of claim 11, wherein the upper surface of the support member has a trough sized to receive the support arm therein when the support arm is pivoted to the support member, and at least one storage bin next to the trough, the upper and lower portions of the support arm tapering outwardly toward each end of the support arm, the trough also tapering outwardly to closely receive the support arm.

19. The foldaway mirror assembly of claim 11, including a plurality of said at least one light source mounted in the mirror member between opposite translucent perimeter walls extending on the opposite surfaces of the mirror member, and within an outer opaque perimeter wall extending around an outer perimeter of the mirror member, for illuminating the translucent perimeter walls at the first and second exposed perimeter surfaces, and a switch in one of the mirror member, support member and support arm, for closing a circuit connecting the power supply in the support member and the light sources.

20. The foldaway mirror assembly of claim 11, including a plurality of said at least one light source mounted in the mirror member, circumferentially spaced on an inner cylindrical core of the mirror member, between opposite translucent perimeter walls extending on the opposite surfaces of the mirror member, and within an outer opaque perimeter wall extending around an outer perimeter of the mirror member, for illuminating the translucent perimeter walls at the first and second exposed perimeter surfaces, and a switch in one of the mirror member, support member and support arm, for closing a circuit connecting the power supply in the support member and the light sources.

\* \* \* \* \*